3,826,716
METHOD FOR PREPARING α-AMYLASE

Georgy Ivanovich Kvesitadze, ulitsa Abasheli 7a, and Georgy Nikolaevich Kokonashvili, ulitsa Perovskoi 4, both of Tbilisi, U.S.S.R., and Raisa Vasilievna Fenixova, ulitsa Novoslobodskaya 67/69, kv. 167, Moscow, U.S.S.R.
No Drawing. Continuation of abandoned application Ser. No. 189,032, Oct. 13, 1971. This application Apr. 2, 1973, Ser. No. 346,785
Claims priority, application U.S.S.R., Oct. 20, 1970, 1,479,555
Int. Cl. C12d 13/10
U.S. Cl. 195—66 R    2 Claims

ABSTRACT OF THE DISCLOSURE

A method for preparing α-amylase by depth cultivation of *Aspergillus oryzae* on a water nutrient medium containing the following ingredients: starch, $NaNO_3$, $MgSO_4$, KCl, $FeSO_4$, $KH_2PO_4$, $Mg(NO_3)_2$, $Mg(H_2PO_4)_2$ and 20 percent by volume of 20 percent extract of malt sprouts. The culture filtrate is dialyzed with phosphate buffer at pH 6.5–7.5. From the dialyzate, the α-amylase is adsorbed on diethylamine ethylcellulose and then eluted with a phosphate buffer (from 0.04 to 0.12M) at pH 6.5–7.5 containing $CaCl_2$ (0.0003–0.001M).

---

This is a continuation of application Ser. No. 189,032, filed Oct. 13, 1971, and now abandoned.

This invention relates to the preparation of enzymes, and more particularly it relates to a method for the preparation of α-amylase.

α-Amylase has been found in animals (in saliva, pancreas), in plants (malt), in molds and bacteria. All these enzymes are α-1,4-glucane-4 glucohydralases (3,2,1,1). They catalyze the hydrolysis of starch, glycogen and related α-1,4-glucanes. Said enzymes however, differ by their molecular weight, thermal stability, optimum pH and other characteristics. Very widely used are various preparations of fungal α-amylase, namely in distillery, bakery, and beer manufacture to hydrolyse natural oligo- and polysaccharides to fermentable sugars. Medical preparations are manufactured on the basis of highly purified α-amylase obtained from fungus *Aspergillus oryzae*.

α-Amylsases isolated from various sources differ by heat stability. Most sensitive toward temperature is α-amylase isolated from Aspergillus; malt amylase is more stable and the greatest stability to temperature is in α-amylase isolated from bacteria.

The enzymes differ also with respect to optimum pH. Fungal α-amylase has an optimum pH of 4.7, salivery and bacterial α-amylase have optimum pHs of 7.0 and 7.2, due to which the fungal α-amylase is more suitable for the manufacture of medicinal preparations used in treating gastrointestinal diseases.

Out of many known methods for preparing α-amylase, most suitable for industrial application is the method developed by Japanese investigators (Anabori et al., J. Biochem. 1954, 41, 577) and modified in the U.S.S.R. (R. V. Feniksova, and G. A. Molodova, Moscow, 1961, J. Microbiology, vol. XXX, issue 4, p. 607).

The method comprises the following operations.

Technical preparation of the enzymes includes isolation by precipitation with organic solvents (ethyl alcohol, as a rule) from an aqueous extract of the culture of *Aspergillus oryzae* grown superficially on wheat bran.

The precipitated preparation is dissolved in water, and passed through a filter. To the filtrate is added an equal volume of calcium acetate solution (0.25M) and the pH of the solution is adjusted to 7.0. The precipitate is separated on a centrifuge, the filtrate is treated with ammonium sulphate, the obtained precipitate is dissolved in water and dialyzed. α-Amylase is precipitated from the dialyzate with 1 percent solution of rivanol, and centrifuged. The obtained precipitate is dissolved in acetate buffer at pH 5.5. The solution is decolorized by shaking with Japanese clay and precipitated with a solution of acetone in the cold at a concentration of 55 percent. The centrifuged precipitate is dissolved with chilled solution of a mixture of calcium acetate and sodium acetate having a concentration of 0.02M. Acetone is added gradually into the solution of α-amylase in the cold until turbidity develops. The solution is then allowed to stand in cold until α-amylase crystals appear. The yield of the thus prepared α-amylase is 20–30 percent of theory.

The disadvantage of the described method is low yield of α-amylase, which is only 25–30 percent and a great number of labour consuming operations. It should be noted also that the final product is not completely homogeneous with respect to proteins and in electrophoresis on polyacrylamide gel it produces three protein lines.

Known also is the method for preparing α-amylase by depth cultivating *Aspergillus oryzae* on a water nutrient medium having the following composition in g./litre: starch 90, $NaNO_3$, 12, $MgSO_4$ 0.65, $KH_2PO_4$ 1.3, KCl 0.5, $FeSO_4$ 0.02 and 200 ml. of 20 percent extract of malt sprouts for 72 hours at a temperature of 30° C. (See Journal of Applied Biochemistry and Microbiology, vol. V, issue 2 U.S.S.R. Academy of Science, 1969, pp. 141–146). Cultivation of mold *Aspergilus oryzae* on said medium in conditions of optimum aeration allows the production of a culture fluid with a high-level biosynthesis of α-amylase.

In this connection the object of this invention is to improve the composition of the culture medium by introducing new ingredients which promote biosynthesis of α-amylase.

Another object of the invention is improvement of the process of purification of α-amylase.

Still another object of the invention is to work out a method for preparation of completely homogeneous α-amylase with respect to protein, and finally the object of the invention is to develop a method for preparation of α-amylase that includes the minimum possible operations and is suitable for industrial realization.

This and other objects of the invention have been realized in the method for preparation of α-amylase by depth cultivation of *Aspergillus oryzae* with aeration on an aqueous nutrient medium containing starch, $NaNO_3$, $MgSO_4$, $KH_2PO_4$, KCl, $FeSO_4$ and malt sprout extract.

According to the invention said mold is cultivated on a nutrient medium containing the following components in g./litre: starch from 50 to 90, $NaNO_3$ from 8 to 15, $MgSO_4$ from 0.4 to 1.5, $KH_2PO_4$ from 0.2 to 1.2, KCl 0.5, $FeSO_4$ from 0.001 to 0.08, $Mg(NO_3)_2$ from 0.2 to 0.8, $Mg(H_2PO_4)_2$ from 0.1 to 0.7 and 20 percent extract of malt sprouts 20 percent by volume.

Introduction of $Mg(NO_3)_2$ and $Mg(H_2PO_4)_2$ into the nutrient medium promotes intense secretion of α-amylase from mycelium of the fungus into the culture fluid.

Cultivation is carried out at a temperature from 28 to 32° C. for 65–80 hours. The obtained culture fluid is separated on a filter from Mycelium; the filtrate which is α-amylase is dialyzed with a phosphate buffer having a concentration from 0.0003 to 0.003 M at pH 6.5–7.5. The phosphate buffer is a mixture of the salts $KH_2PO_4$ and $Na_2HPO_4$. During the dialysis, the solution of α-amylase is freed from a part of pigments, remnants of mineral salts and other low-molecular metabolites. The obtained dialysate, freed from the said substances, is passed through diethylamine ethylcellulose upon which the α-amylase and other proteins are completely adsorbed.

In order to isolate α-amylase and to separate it from the accompanying proteins, two-step elution is used, wherein α-amylase is eluted with the said phosphate buffer. First the adsorbing material is treated with the phosphate buffer (0.04–0.09M) at pH 6.5–7.5 to elute the accompanying proteins. Then the adsorbing material is processed with the said phosphate buffer (0.1–0.12 M) at pH 6.5–7.5 containing $CaCl_2$ at concentration from 0.0003 to 0.001 M, as a result of which a fraction of α-amylase free from other proteins is obtained. The adherence to this order of the elution is a very important factor which ensures preparation of α-amylase which is homogeneous with respect to proteins. The yield of the product is as high as 100 percent. No other process known in the art has ever ensured yields of that order.

Thus, the proposed method for preparation of α-amylase reduces the number of process steps several times compared with the processes known in the prior art.

After lyophilization α-amylase prepared by the proposed method can be stored at 0° C. for three years, the activity of the preparation being lowered not more than 10 percent.

For a better understanding of the present invention by those skilled in the art the following example of an embodiment of the proposed invention is given by way of illustration.

Example

Conidia of a ten-day culture of *Aspergillus oryzae* 3-9-15 grown in a test tube on a 7 percent aqueous solution of beer must containing 2 percent of agar-agar, are washed with sterile tap water and transferred in 5-ml. portions into flasks on a shaker containing nutrient medium of the following composition in g./litre: starch 60, $NaNO_3$ 9.0, $MgSO_4$ 1.0, $KH_2PO_4$ 1, KCl 0.5, $FeSO_4$ 0.03, $Mg(NO_3)_2$ 0.2, $Mg(H_2PO_4)_2$ 0.1 and 10 percent extract of malt sprouts 10 percent by volume. The seeding culture is grown for 30 hours on a shaker reciprocating at a speed of 180 r.p.m., at a temperature of 30° C. Then the seeding culture (0.5 percent) is transferred in sterile conditions into a fermentation tank of 1000-litre capacity holding 500 litres of nutrient medium containing, in g./litre: starch 80, $NaNO_3$ 12, $KH_2PO_4$ 1, $MgSO_4$ 1, KCl 0.5, $FeSO_4$ 0.03, $Mg(NO_3)_2$ 0.8, $Mg(H_2PO_4)_2$ 0.5 and 20 percent extract of malt sprouts 20 percent by volume.

The fermentation is continued for 72 hours at a temperature of 30° C. The fermentation tanks are equipped with spargers through which the air is bubbled, and stirrers. The aeration rate during the first 24 hours is 250 litres per minute, and afterwards the aeration is intensified to 500 litres per minute. To extinguish the foam, sperm oil is used. (Oleinic acid and other antifoam agents can also be used). On termination of the fermentation process, the mycelium is separated on a filter or a separator.

The activity of α-amylase in the culture filtrate is 20 units/ml. The filtrate is dialyzed with 0.003M phosphate buffer at pH 7.15 for 12 hours. The obtained dialyzate is divided into several equal portions containing 1000 mg. of protein each and each having the activity of α-amylase of 10,000 units. Each portion of the dialyzate is passed through an individual column packed with 10 g. of diethylamine ethylcellulose. The diameter of the column is 35 mm., the height 250 mm. During this operation α-amylase and the other proteins are absorbed on the column packing.

Next the α-amylase is eluted from the sorbent. The process is carried out in two steps. The first elution is effected with a 0.06M phosphate buffer at pH 7.15. During this operation only the accompanying proteins are eluted whereas the α-amylase remains on the column packing.

α-Amylase is eluted during the second step when a 0.11 M phosphate buffer at pH 7.15 containing 0.001M solution of $CaCl_2$ is passed through the column. The said buffer completely elutes the fraction containing α-amylase. The yield of α-amylase is 300 mg., having a total activity of 10,000 units, that is the yield of α-amylase after elution is 100 percent. Dialysis, adsorption and elution of proteins is carried out at a temperature of +8° C.

The protein homogeneity of the thus obtained α-amylase was as follows: in ultracentrifuging, one protein peak was obtained and in electrophoresis on polyacrylamide gel there was one protein line. During a repeated adsorption of the α-amylase fraction on diethylamine ethylcellulose and subsequent elution, no α-amylase fraction inactive with respect to α-amylase was separated.

The specific activity of α-amylase obtained according to the proposed method was almost twice as great compared with the activity of α-amylase obtained by the known method.

What is claimed is:

1. A method for preparing α-amylase which comprises depth cultivating of mold *Aspergillus oryzae* with aeration on a water nutrient medium of the following composition, in g. per litre: starch from 50 to 90, $NaNO_3$ from 8 to 15, $MgSO_4$ from 0.4 to 1.5, $KH_2PO_4$ from 0.2 to 1.2, KCl 0.5, $FeSO_4$ from 0.001 to 0.08, $Mg(NO_3)_2$ from 0.2 to 0.8, $Mg(H_2PO_4)_2$ from 0.1 to 0.7 and 20 percent extract of malt sprouts 20 percent by volume, filtering the culture fluid, dialyzing the obtained culture filtrate with 0.0003 to 0.003 M phosphate buffer at pH 6.5–7.5, passing the dialyzate through diethylamine ethylcellulose upon which α-amylase is adsorbed, eluting proteins inactive with respect to α-amylase with 0.04–0.09 M phosphate buffer at pH 6.5–7.5 and eluting α-amylase with 0.1–0.12 M phosphate buffer at pH 6.5–7.5 containing CaCl in concentration from 0.0003 to 0.001 M.

2. The method of claim 1 wherein cultivation is carried out at a temperature of from 28 to 32° C. for 65 to 80 hours.

References Cited

Journal of Applied Biochemistry and Microbiology, vol. V, issue Z, U.S.S.R. Academy of Science, 1969, pp. 141–146.

LIONEL M. SHAPIRO, Primary Examiner

U.S. Cl. X.R.

195—65